United States Patent
Lehman

[11] Patent Number: 5,964,477
[45] Date of Patent: Oct. 12, 1999

[54] AIR BAG COVER WITH HORN SWITCH

[75] Inventor: Robert R. Lehman, Clawson, Mich.

[73] Assignee: TRW Vehicle Safety Systems Inc., Lyndhurst, Ohio

[21] Appl. No.: 08/932,212

[22] Filed: Sep. 17, 1997

[51] Int. Cl.[6] ................................................ B60R 21/20
[52] U.S. Cl. ..................................... 280/728.3; 200/61.54
[58] Field of Search ............................... 280/728.3, 731; 200/61.54

[56] References Cited

U.S. PATENT DOCUMENTS

| 5,198,629 | 3/1993 | Hayashi et al. | 280/731 |
| 5,577,767 | 11/1996 | Nemoto | 280/731 |
| 5,585,606 | 12/1996 | Ricks | 200/61.08 |
| 5,590,902 | 1/1997 | Eckhout | 280/728.3 |
| 5,630,617 | 5/1997 | Hashiba | 280/731 |
| 5,678,849 | 10/1997 | Davis | 280/728.3 |

Primary Examiner—Peter C. English
Attorney, Agent, or Firm—Tarolli, Sundheim, Covell, Tummino & Szabo

[57] ABSTRACT

An apparatus (10) for covering an inflatable vehicle occupant protection device (40) includes a cover (70) having a fixed portion (80) and a tear seam (90) defining first and second movable portions (100, 110). The cover (70) is movable from a closed condition to an open condition upon inflation of an inflatable vehicle occupant protection device (40). A switch assembly (130) in an electric circuit for actuating an electrically actuatable device (132) of the vehicle includes a first switch member (140) movable with the first movable cover portion (100) and a second switch member (142) movable with the second movable cover portion (110). The first cover portion (100) is manually engageable to operate the first switch member (140) to actuate the electrically actuatable device (132). The second cover portion (110) is manually engageable to operate the second switch member (142) to actuate the electrically actuatable device (132). The switch assembly (130) includes a connector section (170) extending along the fixed cover portion (80) and electrically interconnecting the first switch member (140) and the second switch member (142). The connector section (170) is outside of the tear seam (90).

9 Claims, 2 Drawing Sheets

5,964,477

AIR BAG COVER WITH HORN SWITCH

BACKGROUND OF THE INVENTION

1. Technical Field

The present invention relates to a switch for mounting on a portion of a vehicle as part of a vehicle safety apparatus. In particular, the present invention relates to a horn switch that is part of an air bag module mounted on a vehicle steering wheel.

2. Description of the Prior Art

It is known to mount an air bag module on a steering wheel of a vehicle to help protect the driver of the vehicle. The air bag module includes an air bag and an inflator. In the event of sudden vehicle deceleration of a magnitude which requires protection of the driver, the inflator is actuated to inflate the air bag into a position to help protect the driver of the vehicle.

It is known to provide a horn switch that is operable by pressing on a cover of an air bag module mounted on a vehicle steering wheel. U.S. Pat. No. 5,585,606 discloses a membrane type horn switch which is connected with an air bag module cover. The horn switch includes two active parts, each located on a respective movable part of the cover. When the air bag inflates, a rupturable portion of the switch tears to enable the movable cover parts to open so that the air bag can inflate out of the cover.

SUMMARY OF THE INVENTION

The present invention is an apparatus for covering an inflatable vehicle occupant protection device. The apparatus comprises a cover including a fixed portion and first and second movable portions connected with the fixed cover portion for movement relative to the fixed cover portion. The cover is movable from a closed condition to an open condition upon inflation of an inflatable vehicle occupant protection device. The apparatus further includes a switch assembly in an electric circuit for actuating an electrically actuatable device of the vehicle. The switch assembly includes a first switch member movable with the first movable cover portion and a second switch member movable with the second movable cover portion. The first cover portion is manually engageable to operate the first switch member to actuate the electrically actuatable device. The second cover portion is manually engageable to operate the second switch member to actuate the electrically actuatable device. The switch assembly includes a connector section extending along the fixed cover portion and electrically interconnecting the first switch member and the second switch member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
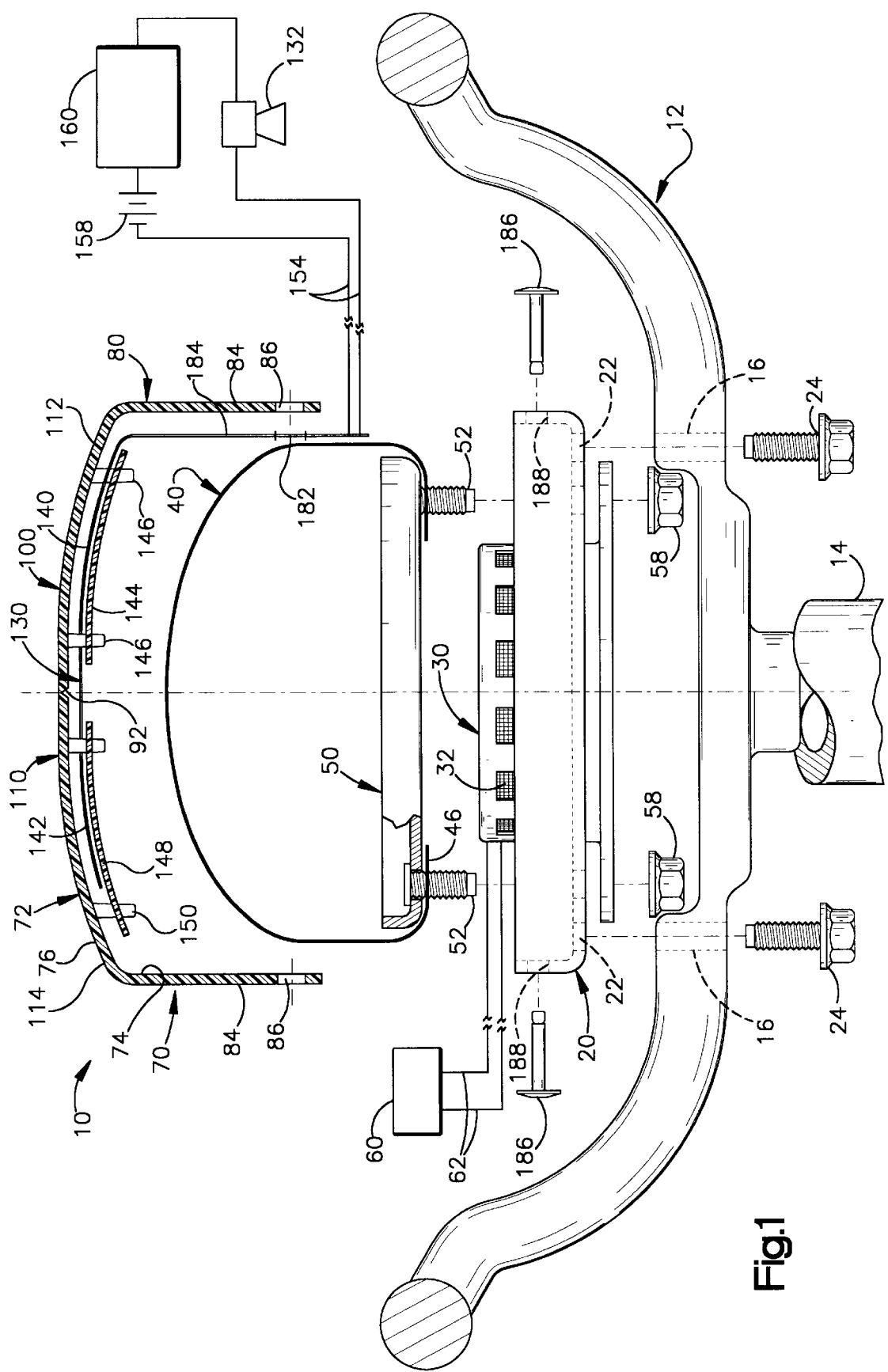
FIG. 1 is a schematic view, partially in section, showing a horn switch as part of an air bag module mounted on a vehicle steering wheel.

The present invention relates to a vehicle safety apparatus including a switch. In particular, the present invention relates to an air bag module which includes a switch for an electrically actuatable device of the vehicle, such as a vehicle horn. As representative of the present invention, FIG. 1 illustrates an air bag module 10.

The air bag module 10 is mounted on a vehicle steering wheel, a portion of which is shown at 12. The steering wheel 12 is supported on a steering shaft or steering column of the vehicle indicated schematically at 14. A plurality of fastener openings 16 are formed in the steering wheel 12.

The air bag module 10 includes a support or base plate 20 which is preferably made from steel or aluminum. A plurality of fastener openings 22 are spaced apart around the periphery of the base plate 20. A plurality of bolts 24 extend through the fastener openings 16 in the steering wheel 12 and are screwed into the fastener openings 22 in the base plate 20. The bolts 24 secure the base plate 20 to the steering wheel 12.

The air bag module 10 includes an inflator 30 which is supported in a known manner (not shown) on the base plate 20. The inflator 30 has one or more fluid outlets 32 for directing inflation fluid into an air bag 40 upon actuation of the inflator. The inflator 30 is illustrated as a pyrotechnic inflator which uses the combustion of gas-generating material to generate inflation fluid in the form of gas to inflate the air bag 40. The module 10 alternatively could include an inflator which contains a stored quantity of pressurized inflation fluid, or a combination of pressurized inflation fluid and ignitable material for heating the inflation fluid.

The air bag 40 is illustrated schematically in a deflated, packed condition in FIG. 1. The air bag 40 is preferably made from a fabric material such as woven nylon. The air bag 40 can alternatively be made from non-woven material, such as plastic film. The use of plastic film, in particular, would require inflation fluid vents to be formed in the air bag 40, as is known in the art.

The module 10 includes a retaining ring 50 from which extend a plurality of fasteners 52, such as weld studs. The fasteners 52 on the retaining ring 50 extend through openings in an end portion 46 of the air bag 40. The retaining ring 50 is secured to the base plate 20 by nuts 58 screwed onto the fasteners 52. The end portion 46 of the air bag 40 is clamped between the retaining ring 50 and the base plate 20. As a result, the air bag 40 is secured in position on the vehicle steering wheel 12, adjacent to the inflator 30.

The vehicle includes known means 60 for sensing a collision involving the vehicle and for actuating the inflator 30 in response to the sensing of a collision. The means 60 may include a deceleration sensor and vehicle electric circuitry for actuating the inflator 30 in response to sensing a vehicle deceleration indicative of a vehicle collision having a severity greater than a predetermined threshold value. As discussed below, the means 60 provides an electric signal over lead wires 62 to the inflator 30, when the inflator is to be actuated.

The air bag module 10 includes a cover 70 for enclosing the air bag 40 and the inflator 30. The cover 70 is made from a material which is strong enough to protect the parts of the air bag module 10 which are enclosed within the cover. The material of the cover 70 is sufficiently flexible or deformable so that it can be resiliently deformed inwardly (that is, in a downward direction as viewed in FIG. 1) by pressure from an occupant of the vehicle, so as to actuate an electrical device of the vehicle such as the vehicle horn.

The cover 70 has a main body portion 72 which has inner and outer side surfaces 74 and 76. The main body portion 72 of the cover 70 includes a fixed part 80 of the cover. A mounting flange or mounting portion 84 of the cover 70 extends from the main body portion 72 in a direction toward the base plate 20. A plurality of first fastener openings 86 are formed in the mounting portion 84 of the cover 70.

Figure 2:
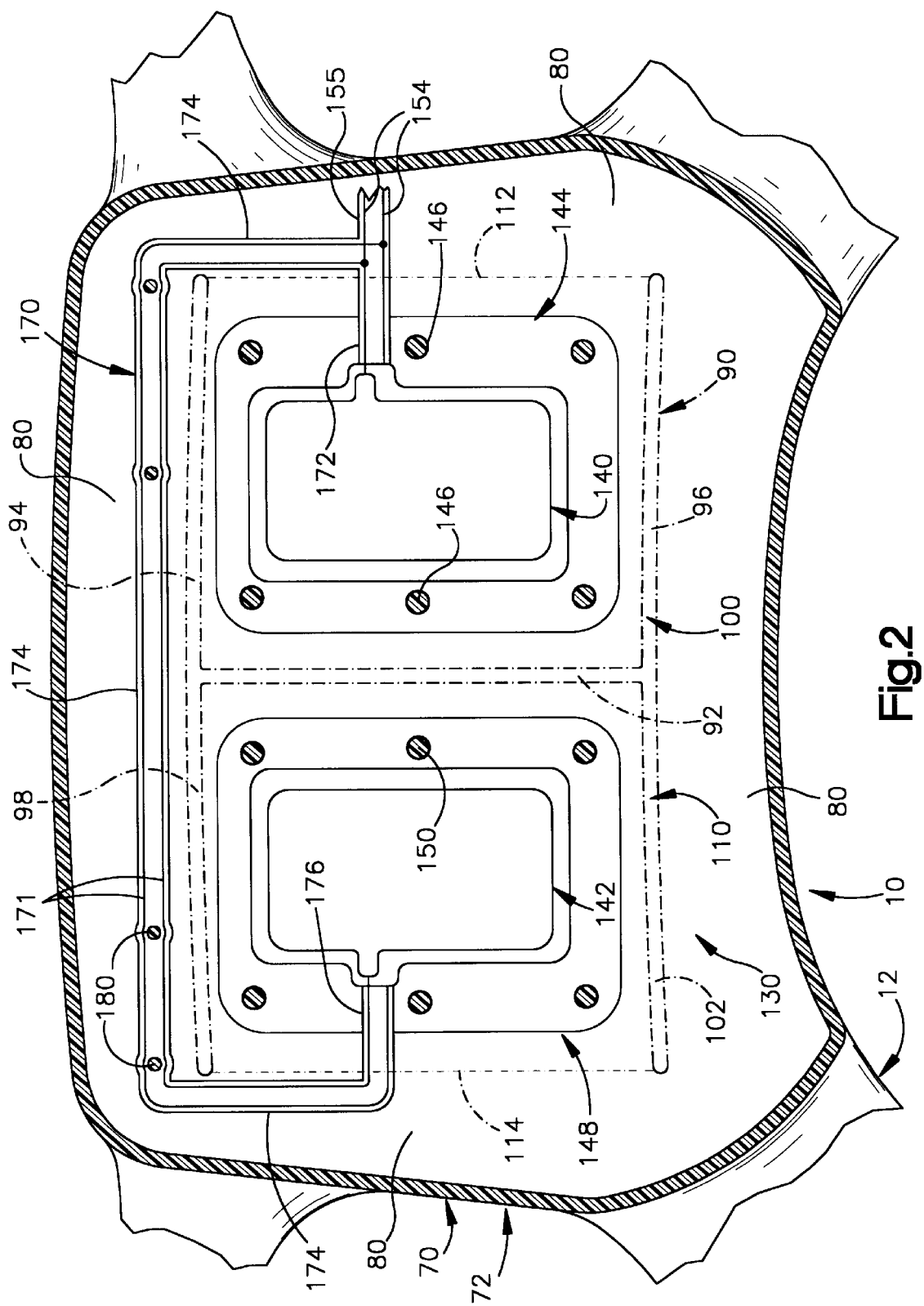
FIG. 2 is a schematic plan view of portions of the air bag module of FIG. 1.

An I-shaped tear seam 90 (FIG. 2) is formed in the main body portion 72 of the cover 70. The tear seam 90 includes a central section 92 and four side sections 94, 96, 98 and 102. The tear seam 90 constitutes a weakened portion of the cover 70 which is rupturable under the force of the inflating air bag 40 to enable the air bag to inflate out of the cover. The tear seam 90 partially defines first and second movable parts 100 and 110 of the cover.

Each one of the first and second movable cover parts 100 and 110 has a generally rectangular configuration. The base 92 and the side sections 94 and 96 of the tear seam 90 extend along three sides of the first movable cover part 100. A first hinge portion 112 of the cover 70 extends along the fourth side of the first movable cover part 100, between the two side sections 94 and 96 of the tear seam 90. The first hinge portion 112 connects the first movable cover part 100 to the fixed cover part 80 for pivotal movement relative to the fixed cover part.

The base 92 and the other two side sections 98 and 102 of the tear seam 90 extend along three sides of the second movable cover part 110. A second hinge portion 114 of the cover 70 extends along the fourth side of the second movable cover part 110, between the two side sections 98 and 102 of the tear seam 90. The second hinge portion 114 connects the second movable cover part 110 to the fixed cover part 80 for pivotal movement relative to the fixed cover part.

The air bag module 10 includes a switch assembly or switch 130 for actuating an electrically actuatable device of the vehicle, such as a vehicle horn indicated schematically at 132 (FIG. 1). In the preferred embodiment, the switch 130 is a membrane switch of a known type which includes first and second layers of electrically conductive material (not shown) normally separated by a dielectric material. The layers of conductive material are engageable with each other, in response to the application of force to the switch 130, to change the resistance of the switch.

The switch 130 includes first and second active switch members or actuator pads 140 and 142. The first actuator pad 140 is mounted with a first back plate 144 at a position underlying the first movable cover part 100. The first actuator pad 140 is located between the first back plate 144 and the inner side surface of the first movable cover part 100. A plurality of pins 146 which extend inward from the first movable cover part 100 secure the first back plate 144 to the first movable cover part. The first back plate 144 provides a relatively rigid support for the first actuator pad 140, so that force applied to the first cover part 100 can result in operation of the first actuator pad of the switch 130. The first back plate 144 and the first actuator pad 140 are movable with the first movable cover part 100. (The spacing between the first movable cover part 100, the first actuator pad 140, and the first back plate 144 is exaggerated, for clarity, in FIG. 1.)

The second actuator pad 142 is mounted with a second back plate 148 at a position underlying the second movable cover part 110. The second actuator pad 142 is located between the second back plate 148 and the inner side surface of the second movable cover part 110. A plurality of pins 150 which extend inward from the second movable cover part 110 secure the second back plate 148 to the second movable cover part. The second back plate 148 provides a relatively rigid support for the second actuator pad 142, so that force applied to the second cover part 110 can result in operation of the second actuator pad of the switch 130. The second back plate 148 and the second actuator pad 142 are movable with the second movable cover part 110.

A pair of lead wires 154 or other known type of electrical conductor are electrically connected with the first actuator pad 140. The lead wires 154 are preferably formed as layers of conductive material on a flexible substrate 155. The flexible substrate 155 may be formed as one piece with substrate material of one of the layers of electrically conductive material of the membrane switch 130. The lead wires 154 extend from the first actuator pad 140, across the first hinge portion 112 of the cover 70, and into a position underlying the fixed portion 80 of the cover. The lead wires 154 connect the switch assembly 130 with the vehicle horn 132, with a power source 158 such as the vehicle battery, and with vehicle electric circuitry indicated schematically at 160.

The first and second actuator pads 140 and 142 are electrically interconnected by an elongate connector section 170 of the switch 130. The connector section 170 of the switch 130 is formed as one piece with the actuator pads 140 and 142. The connector section 170 is preferably formed as a pair of conductive leads 171 on a portion of the flexible substrate 155.

A flexible first portion 172 of the connector section 170 of the switch 130 extends from a location underlying the first movable cover part 100, across the first hinge portion 112 of the cover 70, to a location underlying the fixed cover portion 80. A U-shaped second portion 174 of the connector section 170 of the switch 130 extends along and under the fixed cover portion 80, at a location outside of (above as viewed in FIG. 2) the two side sections 94 and 98 of the tear seam 90. A flexible third portion 176 of the connector section 170 of the switch 130 extends across the second hinge portion 114 of the cover 70, to a location underlying the second movable cover part 110. The third portion 176 of the connector section 170 is electrically connected with the second actuator pad 142.

The connector section 170 of the switch 130 is, preferably, secured to the fixed portion 80 of the cover 70, by a plurality of pins or other connectors 180, for example. The connector section 170 of the switch 130 is located outside of the tear seam 90 and does not extend across any portion of the tear seam. The switch 130 does not have a predetermined rupturable portion or tear seam portion.

A plurality of fastener openings 182 (FIG. 1) are formed in an inactive portion 184 of the switch 130. When the switch 130 is assembled on the module 10, the mounting portion 84 of the cover 70 overlies the inactive portion 184 of the switch 130. Rivets 186 extend through the fastener openings 86 in the mounting portion 84 of the cover 70 and through the fastener openings 182 in the inactive portion 184 of the switch 130. The rivets 186 extend through fastener openings 188 in the base plate 20. The inactive portion 184 of the switch 130 is clamped between the mounting portion 84 of the cover 70 and the base plate 20.

To effect operation of the vehicle horn 132, the driver of the vehicle presses on the cover 70 of the air bag module 10 in a downward direction as viewed in FIG. 1. The force applied to the cover 70 of the air bag module 10 is transmitted through the cover to the switch 130. Specifically, force applied to the first movable cover part 100 is transmitted to the first actuator pad 140. The first actuator pad 140 is operated, and the vehicle horn 132 is energized. When force is applied to the second actuator pad 142, the force is transmitted to the second movable cover part 110, the second actuator pad is operated, and the vehicle horn 132 is energized.

When the force on the cover 70 of the air bag module 10 is released, the resilience of the cover causes it to move away from the air bag 40. As this movement occurs, the switch 130 returns to its original condition. The electrical resistance of the switch 130 returns to its first level. This change in the resistance of the switch 130 is sensed by the vehicle electric circuitry 160, and the vehicle horn 132 is de-energized.

In the event of an impact to the vehicle of a magnitude greater than the predetermined threshold value, the sensing means 60 provides an electrical signal over the wires 62 to the inflator 30. The inflator 30 is actuated in a known manner. Inflation fluid flows out of the inflator 30 through the fluid outlets 32 and into the air bag 40. The rapidly flowing inflation fluid causes the air bag 40 to inflate in an upward direction as viewed in FIG. 1.

The force of the inflating air bag 40 is applied against the inside of the switch 130 and the cover 70. Specifically, the inflating air bag 40 pushes outward against the first and second back plates 144 and 148 and against the inner side surface 74 of the cover 70. The cover 70 opens along the I-shaped tear seam 90, which is the predetermined weakened portion of the cover. The first and second movable cover parts 100 and 110 move away from each other, pivoting about the hinge portions 112 and 114, respectively, into an open condition (not shown). The cover 70 opens sufficiently that the air bag 40 inflates between the first and second movable cover parts 100 and 110 into a position to help protect the vehicle occupant.

When the cover 70 moves to the open condition, the first actuator pad 140 moves with the first movable cover part 100 and the second actuator pad 142 moves with the second movable cover part 110. The first and third portions 172 and 176 of the connector section 170 of the switch 130, which extend across the hinge portions 112 and 114 of the cover 70, bend but do not break or rupture. The second portion 174 of the connector section 170 of the switch, because it underlies and is secured to the fixed portion 80 of the cover 70, does not move during the opening of the cover 70. The connector section 170 of the switch 130 maintains the electrical connection between the actuator pads 140 and 142, both during and after movement of the cover 70 from the closed condition to the open condition.

The switch 130 can be used to actuate an electrically actuatable device of the vehicle other than the vehicle horn 132. For example, the switch 130 could be used to actuate or control the vehicle radio, speed control, etc. Alternatively, the switch 130 could have a plurality of electrically independent active areas for controlling a plurality of electrically actuatable devices including the vehicle horn 132.

From the above description of the invention, those skilled in the art will perceive improvements, changes and modifications. For example, the present invention is not limited to an air bag module which is mounted on a vehicle steering wheel. The present invention can be used with an air bag module mounted on a vehicle instrument panel, a vehicle seat or door panel, or other portion of the vehicle. Such improvements, changes and modifications within the skill of the art are intended to be covered by the appended claims.

Having described the invention, I claim:

1. An apparatus for covering an inflatable vehicle occupant protection device, comprising:

a cover including a fixed portion and first and second movable portions connected with said fixed cover portion for movement relative to said fixed cover portion;

said cover being movable from a closed condition to an open condition upon inflation of an inflatable vehicle occupant protection device; and a switch assembly in an electric circuit for actuating an electrically actuatable device of the vehicle, said switch assembly including a first switch member movable with said first cover portion and a second switch member movable with said second movable cover portion;

said first movable portion being manually engageable to operate said first switch member to actuate said electrically actuatable device, said second movable portion being manually engageable to operate said second switch member to actuate said electrically actuatable device;

said switch assembly including a connector section extending along said fixed cover portion and electrically interconnecting said first switch member and said second switch member;

said first and second switch members including a flexible substrate material, said connector section formed as a pair of conductive leads on a portion of said flexible substrate material.

2. An apparatus as set forth in claim 1 wherein said cover has a tear seam defining said first and second movable portions of said cover, said connector section of said switch assembly extending around said tear seam.

3. An apparatus as set forth in claim 2 wherein said tear seam has an I-shaped configuration, each one of said first and second movable cover portions having a generally rectangular configuration defined by three portions of said tear seam and a respective hinge portion of said cover.

4. An apparatus as set forth in claim 3 wherein said cover includes a first hinge portion connecting said first movable cover portion with said fixed cover portion for movement relative to said fixed cover portion and a second hinge portion connecting said second movable cover portion with said fixed cover portion for movement relative to said fixed cover portion, said connector section of said switch assembly extending across said first and second hinge portions of said cover.

5. An apparatus as set forth in claim 1 wherein said connector section of said switch assembly has flexible, non-rupturing portions which extend across first and second hinge portions of said cover.

6. An apparatus as set forth in claim 1 wherein said connector section of said switch assembly extends from said first movable cover portion across a first hinge portion of said cover to said fixed portion of said cover and from said fixed portion of said cover across a second hinge portion of said cover to said second movable portion of said cover.

7. An apparatus for covering an inflatable vehicle occupant protection device, comprising:

a cover having an I-shaped tear seam defining a fixed portion and first and second movable portions of said cover;

said first and second movable cover portions being connected with said fixed cover portion by respective first and second hinge portions of said cover to enable movement of said cover from a closed condition to an open condition upon inflation of the inflatable device;

a switch assembly in an electric circuit for actuating an electrically actuatable device of the vehicle, said switch assembly including a first switch member movable with said first movable cover portion and a second switch member movable with said second movable cover portion; and connector means for electrically interconnecting said first switch member and said second switch member when said cover is in the closed condition and when said cover is in the open condition;

said first movable cover portion being manually engageable to operate said first switch member to actuate said electrically actuatable device, said second movable cover portion being manually engageable to operate said second switch member to actuate said electrically actuatable device;

said connector means comprising conductive leads formed as one piece with said first and second switch members on a flexible substrate material.

8. An apparatus as set forth in claim 7 wherein said connector means extends along said fixed cover portion at a location outside of said tear seam.

9. An apparatus as set forth in claim 8 wherein said connector means has a U-shaped configuration.

* * * * *